United States Patent [19]

Horn et al.

[11] Patent Number: 5,219,710
[45] Date of Patent: Jun. 15, 1993

[54] POLYMERIC NITRONES HAVING A STYRENE-DERIVED BACKBONE CHAIN

[75] Inventors: Keith A. Horn, Morris, N.J.; Christine L. Lau, New Haven, Conn.

[73] Assignee: Allied-Signal Inc., Morristownship, Morris County, N.J.

[21] Appl. No.: 797,581

[22] Filed: Nov. 25, 1991

[51] Int. Cl.$^5$ .................. G03C 1/73; C08F 12/00
[52] U.S. Cl. .................. 430/270; 525/327.2; 526/245; 526/292.2; 526/298; 526/311; 430/290
[58] Field of Search ............... 430/290, 270; 525/327.2; 526/245, 311, 298, 292.2

[56] References Cited

U.S. PATENT DOCUMENTS

| | | | |
|---|---|---|---|
| 3,988,229 | 10/1976 | Pacifici et al. | 204/159.23 |
| 4,677,049 | 6/1987 | Griffing et al. | 430/339 |
| 4,702,996 | 10/1987 | Griffing et al. | 430/325 |
| 5,136,682 | 8/1992 | Moyer et al. | 385/141 |
| 5,176,983 | 1/1993 | Horn et al. | 430/270 |

FOREIGN PATENT DOCUMENTS 92002856 2/1992 European Pat. Off. .

OTHER PUBLICATIONS

Beeson, K. W. et al: Chemical Abstract 116 (14):139850j.
Mohlman et al., "Polymeric Guided Wave Optics", SPIE 1177-09, pp. 67-78, Boston, Sep. 1989.
Horn et al., "Polymeric Materials for Guided Wave Devices", Int. Chem. Congress of Pacific Basin Soc., Honolulu, Hawaii, Dec. 17-22 (1989), Mar. 1982.
D. Braun, "Über Umsetzungen an Poly-p-Lithium-styrol", Makromol, Chem. 44, 269 (1961).
C. K. Mann, "Some Chemical Reactions of Poly(p-Chloromethyl-styrene) Resin in Dimethylsulfoxide", Polymer Lett., 3, 505 (1965).
S. Uchida, "Synthesis of N-Arylhydroxylamines by Tellurium-Catalyzed Reduction of Aromatic Nitro Compounds", Chem. Lett., pp. 1069-1070 (1986).
R. Schiever et al., "Optical Waveguiding in doped poly(methyl methacrylate)", Polymer, 1985, 26, Aug. (Conference issue) pp. 1423-1427.
Takato et al., "Polymer waveguide star coupler", Applied Optics, 21, No. 11 Jun. (1982) pp. 1940-1941.
Kurokawa et al., "Polymer optical circuits for multimode optical fiber systems", Applied Optics, 19, No. 18, Sep. 15, 1980, pp. 3124-3129.
Kurokawa et al., "Polymer Optical Circuits for Multimode Optical Fiber Systems", Org. Coat. Plast. Chem., 1979, 40, pp. 368-373.
Kurokawa et al., "Fiber optic sheet formation by selective photopolymerization", Applied Optics, 17, No. 4, Feb. 15, 1978, pp. 646-650.
Kurokawa et al., "Optical waveguide intersections without light leak", Applied Optics, 16, No. 4, Apr. (1977), pp. 1033-1037.
Katayama et al., "Formation Method of Optical Waveguides in a Polymer Film ... " Org. Coat. Plast. Chem., 1979, 40, pp. 374-379.
H. Franke, "Refractive-index patterns in doped PMMA films, recorded with a HeNe laser", Polymer, 28, (1987) pp. 659-662.
H. Franke, "Optical recording of refractive-index patterns in doped poly-(methyl methacrylate) films", Applied Optics, 23, No. 16, Aug. 15, 1984, pp. 2729-2733.
Franke et al., "Light induced refractive index changes in PMMA films doped with styrene", Coll. & Pol. Science, 262, No. 3, (1984), pp. 213-216.

(List continued on next page.)

Primary Examiner—Marion E. McCamish
Assistant Examiner—Rosemary Ashton
Attorney, Agent, or Firm—Gerhard H. Fuchs; Richard C. Stewart

[57] ABSTRACT

Polymer compositions having a styrene-derived backbone chain and having pendant side chains containing a nitrone functional group undergo changes in refractive index upon exposure to actinic radiation. Waveguides are "written" in films containing such polymers by exposing predetermined areas to sufficient radiation to change the refractive index.

41 Claims, No Drawings

OTHER PUBLICATIONS

Driemeier et al., "High-resolution photorefractive polymer for optical recording of waveguide gratings", 25, No. 17, Sep. 1, 1986, Appl. Optics, pp. 2960–2966.

L. A. Hornak, "Polyalkylsilyne photodefined thin-film optical waveguides", J. Applied Phys., 67, No. 5, Mar. 1, 1990, pp. 2235–2239.

"Photoinduced channel waveguide formation in nonlinear optical polymers" Electronics Letters, 26, No. 6, Mar. 15, 1990, pp. 379–380.

Luckemeyer et al., "Photoinduced Phase Modulation in PMMA Lightguides doped with an Azo Dye", SPIE Taguny, LA. 90.

Chemical Abstracts, vol. 85, p. 39, 85:22348b.

Chemical Abstracts, vol. 109, p. 762, 109:160628h.

Chemical Abstracts, vol. 109, p. 599, 109:101917d.

Chemical Abstracts, vol. 107, p. 759, 107:187266j.

O. H. Wheeler et al., "Absorption Spectra of Azo-and Related Compounds, II[1] Substituted Phenylnitrones", JACS, 78, (1956), pp. 3363–3366.

"Preparation of Oxaziranes by Irradiation of Nitrones", Communications, vol. 23, Apr. 1958, pp. 651–652.

Splitter et al., "Oxaziridines. I. The Irradiation Products of Several Nitrones" Oxaziridines, Oct. 1965, pp. 3427–3436.

"Orbital Symmetry Control in the Nitrone-Oxaziridine System. Nitrone Photostationary States", J. Am. Chem. Soc., (93:16), Aug. 11, 1971, pp. 4075–4076.

Smets et al., "Influence of Rigid Polymer Matrices on the Reversible Photochemical Reaction . . . ", J. Pol. Science, vol. 14, (1976), pp. 2983–2994.

POLYMERIC NITRONES HAVING A STYRENE-DERIVED BACKBONE CHAIN

FIELD OF THE INVENTION

This invention provides polymers having a styrene-derived backbone chain containing side-chain nitrone functional groups. These polymers undergo a change in refractive index upon exposure to actinic radiation. The decrease in refractive index of thin films of these polymers upon such exposure can be utilized for making optical waveguides or other optical device structures.

BACKGROUND OF THE INVENTION

With the development of single-chip integrated optical structures containing laser sources, passive and active waveguides and detectors, new materials are needed for making waveguides, "chip-to-chip" and "backplane interconnects" that can be patterned using processing technologies suitable for silicon and gallium arsenide electronic devices. Organic polymer films offer potential advantages over waveguides based on inorganic crystals, because the former can be processed at much lower temperatures; they are amenable to solution spin casting and other coating techniques; they have lower dielectric constants; and they can have large electro-optic or other nonlinear optical responses that are electronic in origin and therefore have low losses even in high frequency regimes.

Free-standing and embedded rib waveguides have been formed in organic films by generating refractive index patterns by methods such as (1) photochemical crosslinking, followed by dissolution of the remaining uncrosslinked material; (2) "photo-locking", i.e. photochemical attachment, dimerization or polymerization of a high refractive index monomer in a transparent polymer matrix film, followed by baking to remove the remaining volatile monomer from unirradiated areas; (3) patterned argon ion laser irradiation; and (4) thermal annealing. Further, photochemical bleaching of dye molecules in polymer matrices without crosslinking, dimerization or polymerization has been explored as a mechanism for changing the refractive index in organic thin films.

Formation of waveguide structures in nonlinear optical organic materials (including polymers) through the photochemical transformation of photoreactive functional groups (photodelineation) is disclosed in commonly assigned copending U.S. appl. Ser. No. 456,411, filed Dec. 26, 1989 by McFarland et al. for "Method for Forming Optically Active Waveguides". Also, Mohlman et al. [G. R. Mohlman et al., SPIE 1177 0-9, 67, Boston, September, 1989] have described the use of radiation from a mercury lamp to bleach films of a methacrylate polymer with a side chain 4-dimethylamino-4'-nitrostilbene photoreactive functional group to produce optical waveguide structures. Horn et al. have described similar laser and contact mask exposure patterning of channel waveguide structures in thin films of poly(methylmethacrylate) ("PMMA") containing dispersed monomeric nitrones [see, for example, Horn et al., "Polymeric Materials for Guided Wave Devices", The 1989 International Chemical Congress of Pacific Basin Societies, Honolulu, Hi., Dec. 17-22, 1989, Macr. 82]. Their monomeric nitrones were made by standard synthetic routes from the corresponding aldehydes and substituted hydroxylamines. Doses of only several mJ to hundreds of mJ per square centimeter were required to fully bleach thin films of nitrones in PMMA. The homopolymer poly(4-(N-phenyl-α-nitronyl)phenyl methacrylate) and copolymers of methyl methacrylate with 4-(N-phenyl-α-nitronyl)phenyl methacrylate and use thereof for laser direct writing of channel waveguides and passive integrated optical circuits are disclosed in commonly assigned co-pending U.S. appl. Ser. No. 664,248 now U.S. Pat. No. 5,176,983 filed 4 March 1991 by Horn et al. for "Polymeric Nitrones Having an Acrylic Backbone Chain."

Waveguides utilizing nitrones disclosed in the prior art are based on monomeric nitrones. We are not aware of any prior art disclosure of a synthetic route to polymers with nitrone functional groups. There are several reasons for this. First, the nitrones are excellent radical scavengers, as illustrated by the fact that monomeric nitrones are used as stabilizers for polymers especially during processing at elevated temperatures (e.g. melt processing). Thus, free radical polymerization of monomers containing nitrone functional groups is fully inhibited by the functional group itself. Second, attempted syntheses of nitrone polymers containing olefinic functional groups can result in dipolar cycloaddition. Apparently, there is no standard route to polymeric nitrones.

While photodelineation of organic films to form waveguides provides significant improvements over the prior art because it eliminates involved processing steps and avoids both thermal and etch damage to sensitive silicon and gallium arsenide electronic components, the existing materials have several shortcomings. In the known dye/polymer (guest/host) materials only low concentrations (<30%) of the monomeric dye can be dissolved in the transparent host polymer matrices such as PMMA, polystyrene polyvinyl alcohol and polycarbonate. For example, concentrations of above about 9-13 percent of the azo dye disperse red #1 in PMMA result in phase separation and crystallization, producing a highly scattering film. Also, the photochemically reactive dye species is readily leached out of the host matrix by solvents used in subsequent processing steps, or it is baked out in the course of removal of residual spinning solvent, resulting in refractive index changes in the waveguide films. Further, the glass transition temperature of the guest/host film generally decreases with increasing dye molecule concentration, thus compromising the physical integrity of the film. In addition, all of the chromophores previously used in these systems, except for the nitrones, have low quantum yield photoreactions, and thus require high actinic radiation does. While the prior art polymeric systems avoid the problems of the guest/host systems—i.e. low concentration limit, bake-out and $T_g$ deterioration—the photochemical reaction quantum yields for their chromophores still tend to be low. The exposure doses required for refractive index changes (to 50% of saturation) generally are on the order of joules to hundreds of joules per square centimeter, with resultant exposure times of hours with standard lamps and laser sources. These high irradiation doses tend to degrade the polymer backbone, and result in cross linking or other adverse side reactions, with undesirable refractive index changes and deterioration of physical properties. Further, at these high irradiation levels, secondary photoproducts are generated which, even in trace amounts, can cause unacceptably large waveguide losses if they absorb in the visible or infrared regions.

There is a need for new polymeric materials whose refractive index can be changed by actinic radiation with low doses while avoiding or alleviating the above stated shortcomings of the prior art materials.

SUMMARY OF THE INVENTION

The present invention provides polymers based on styrene or substituted styrene-derived backbones which are substituted with side chains bearing functionalized nitrones. The polymers are prepared by novel synthetic routes which avoid the difficulties of the prior art. They are soluble in solvents of the type commonly employed for spin coating (in specific cases even at 100 mol % loading of the photoreactive nitrone chromophore). They form amorphous films transparent to many visible and near IR laser sources, and they can be photochemically bleached with UV or visible radiation with high photospeed. The radiation doses required are sufficiently low so that photochemical side reactions of the polymer backbone are minimized. The waveguide losses in these polymer films are surprisingly lower than in guest/host compositions of comparable nitrone loading. The films are thermally stable, showing less than 6 percent weight loss by TGA analysis to temperatures as high as 200° C. Since the photoreactive chromophores are attached to the polymer backbone, there is no loss of the chromophore during processing steps which require heating to temperatures below the onset of thermal decomposition. Waveguide structures with low transmission losses can be photochemically delineated in thin films of these polymers.

The novel polymeric nitrones of the present invention have the general formula:

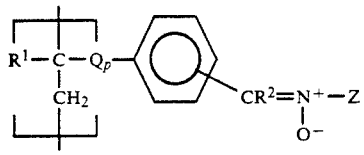

(I)

wherein:

n is greater than about 10;

p is 0 or 1;

$R^1$ is H or $C_1$-$C_{20}$ alkyl, straight chain, branched or cyclic, with the proviso that when $R^1$ is an alkyl group other than methyl, then its α-carbon always represents a —$CH_2$— group;

$R^2$ is H, $C_1$-$C_6$ alkyl, phenyl or benzyl;

Q is a

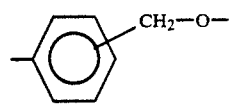

bridging group, wherein the —$CH_2$—O— substituent is in the m- or p- position;

Z is (i) $C_1$-$C_{20}$ alkyl, straight chain, branched or cyclic; or (ii)

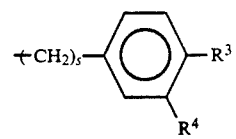

wherein s is 0 or 1, and wherein $R^3$ and $R^4$, which may be the same or different, are selected from the group consisting of H, F, Cl, Br, I, —CN, —$NO_2$, —$R^5$, $NR^5_2$, —$OR^5$, —$COOR^5$ and —CH=CH-$COOR^5$ wherein $R^5$, which may be the same or different in different $R^5$ groups, is a $C_1$-$C_{20}$ alkyl group, straight chain, branched or cyclic.

Within the class of polymeric nitrones according to formula (I), above, there are several subclasses of particular interest, which are as defined by formulas (II) through (VII), set forth below:

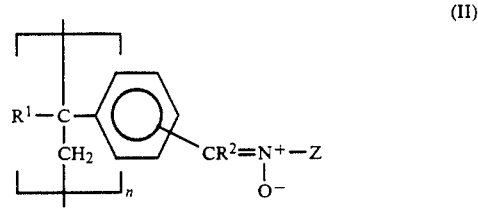

(II)

wherein n, $R^1$, $R^2$ and Z are as described in connection with formula (I), above;

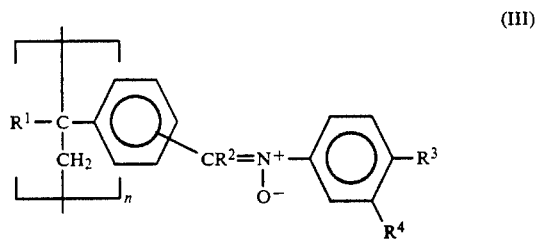

(III)

wherein n, $R^1$, $R^2$, $R^3$ and $R^4$ are as described in connection with formula (I), above;

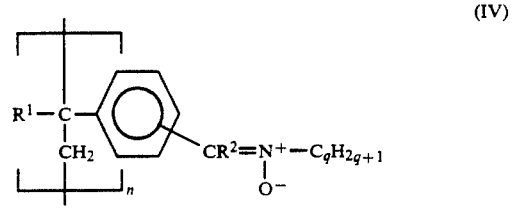

(IV)

wherein n, $R^1$ and $R^2$ are as described in connection with formula (I), above, and q is an integer of from 1 to about 20;

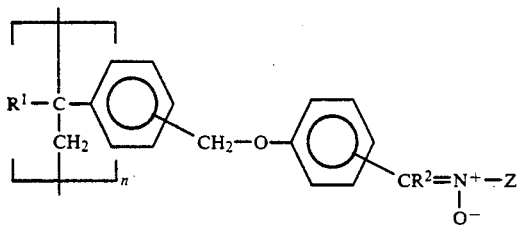

(V)

wherein n, $R^1$, $R^2$ and Z are as described in connection with formula (I), above;

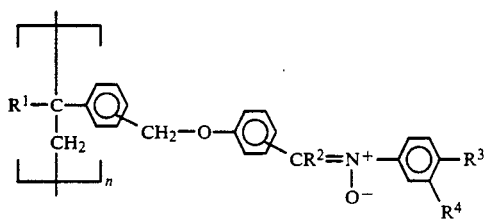

(VI)

wherein n, $R^1$, $R^2$, $R^3$ and $R^4$ are as described in connection with formula (I), above; and

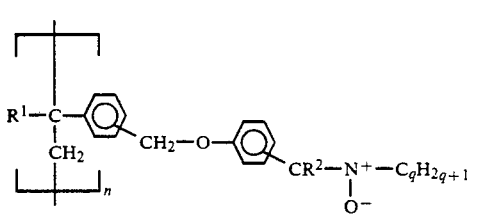

(VII)

wherein n, $R^1$ and $R^2$ are as described in connection with formula (I), above, and q is an integer of from 1 to about 20.

The present invention further provides methods for making the above-described polymeric compositions, thin films of these compositions, waveguides comprising these compositions, and methods for defining waveguides in films of these compositions.

DETAILED DESCRIPTION OF THE INVENTION, OF THE PREFERRED EMBODIMENTS, AND OF THE BEST MODE PRESENTLY CONTEMPLATED FOR ITS PRACTICE

The polymers of formula II, above, can be synthesized by the reaction of poly(formylstyrene) with either aromatic or aliphatic hydroxyl amines. The formation of monomeric nitrones from the condensation of hydroxyl amines with aldehydes is well known. However, no such reactions are known for polymers. Poly(4-formylstyrene) can be readily prepared by the reaction of poly(4-lithiostyrene) with DMF as described by D. Braun [D. Braun, *Makromol. Chem.*, 44, 269 (1961)]. Poly(formylstyrene) with a meta/para substitution isomer ratio of approximately 60/40 can be synthesized by the reaction of poly(vinylbenzylchloride) [alternatively known as poly(chloromethylstyrene)] and DMSO and sodium bicarbonate as described by C. K. Mann [C. K. Mann, et al. *Polymer Lett.*, 3, 505 (1965)]. These polymeric aldehydes can be used to prepare the corresponding polymeric nitrones of formulas II to IV, above. For example, poly(3-/4-formylstyrene) [prepared from poly(vinylbenzylchloride), available from Aldrich Chemical Co., Inc. with an average molecular weight of ca. 55,000] can be reacted with an excess of phenylhydroxylamine in anhydrous THF for 48 hours at room temperature. The reaction is run in the dark as the polymeric nitrone is sensitive to UV light. The polymer is precipitated in water, collected by filtration and dried. The molecular weight distribution should be the same as that of the starting poly(3-/4-formylstyrene). Anhydrous magnesium sulfate can be used to remove the equivalent of water released during the condensation to drive this equilibrium reaction to completion. Reaction of poly(3-/4-formylstyrene) with other substituted phenylhydroxylamines [S. Uchida, et al. *Chem. Lett.*, 1069 (1986)] or with aliphatic hydroxylamines such as tert-butylhydroxylamine under conditions similar to those described for phenylhydroxylamine would yield the corresponding N-substituted nitrones (those of formulas III and IV, above). For polymers of the formula II, above, bearing an $R^2$ group other than H, the corresponding polymeric ketone [e.g. poly(4-phenacylstyrene)] would have to be used in the condensation reaction with the hydroxylamines.

The styrenic nitrones of formula V, above, are prepared in two steps from poly(vinylbenzylchloride). Thus poly(vinylbenzylchloride) [available from Aldrich Chemical Co., Inc., meta/para ratio ca. 60/40, average molecular weight ca. 55,000] is dissolved in anhydrous dimethylformamide and reacted at 80° C. with 4-hydroxybenzaldehyde and powdered potassium carbonate. The slurry is typically heated at 80° C. for three days and then the poly(vinylbenzyl(4-formylphenyl)ether) is precipitated in water. Purification is accomplished by washing the polymer with water to remove the base followed by dissolution in methylene chloride and reprecipitation in water. The reaction of poly(vinylbenzyl(4-formylphenyl)ether) with phenylhydroxylamine in methylene chloride at room temperature (typically 3–7 days in the dark) yields poly(vinylbenzyl(4-(N-phenyl-α-nitronyl)phenyl)ether). The polymeric nitrone is purified by precipitation in methanol. Again, the nitrone synthesis is run in the dark because of the light sensitivity of the nitrone functional group and anhydrous magnesium sulfate or other drying agent can be used to drive the equilibrium condensation to completion.

Nitrones corresponding to formula VI, above, can be prepared by the reaction of poly(vinylbenzyl(4-formylphenyl)ether) with substituted phenylhydroxylamines [S. Uchita, et al., *Chem. Lett.*, 1069 (1986)]. Polymeric nitrones of the formula VII, above, can be synthesized using aliphatic hydroxylamines such as tert-butylhydroxylamine under the conditions used for the formation of the N-phenyl substituted nitrone polymer. For polymers of formula V, above, bearing an $R^2$ group other than H, the corresponding polymeric ketone [e.g. poly(vinylbenzyl(4-phenacylphenyl)ether)] would have to be used in the condensation reaction with the hydroxylamines.

All polymers of general formula I, above, are by definition atactic and, accordingly, so are all of the compounds prepared in the examples set forth below. In these examples, $^1$H NMR data were used to demonstrate the formation of the nitrone. The absence of the aldehyde hydrogen at ca. δ9–10 was used as the primary means for determining when the nitrone reaction was complete. IR spectroscopy and $^{13}$C NMR data were used to confirm the structural data. Differential scanning calorimetry (DSC) provided estimates of the glass transition temperatures except in those cases where the glass transition temperature was very near the decomposition temperature of the polymer, or where the transition was weak. In these cases, thermal mechnanical analysis (TMA) can sometimes be used.

The polymers of this invention (general formula I, above) generally will have molecular weights in the order of 2000 to 500,000, and a typical average molecular weight of from about 15,000 to about 100,000. Their glass transition temperatures will ordinarily be in the range of from about 50° C. to about 150° C. Intrinsic viscosity measurements in dimethylformamide, nitrobenzene or chloroform provide qualitative estimates of the molecular weights of the nitrone polymers. Typical intrinsic viscosities of polymers useful for the spin coating of substrates are in the range of from about 0.1 to 0.4. Gel permeation chromatography can only be used for molecular weight determination if polar solvent combinations such as dimethylformamide and 0.1M sodium nitrate are used. In lower polarity solvents the polymers tend to elute with the solvent front and no estimate of molecular weight is possible.

The polymers of the present invention are transparent from 400 nm to 2000 nm with the exception of narrow regions where infrared overtone or absorption bands occur. They readily form transparent films when cast or spin cast from solvents such as dimethylformamide, dimethyl sulfoxide, dimethylacetamide and the like.

In all cases the UV-visible absorption spectrum of the polymeric nitrones exhibited a long wavelength nitrone absorption in the region of 250–400 nm which was readily bleached with UV irradiation, total fluences to full bleach being less than 0.5 J/cm$^2$ and being typically in the range of 100–200 mJ/cm$^2$. Specifically, for poly(-vinylbenzyl(4-(N-phenyl-α-nitronyl)phenyl)ether), between 168 mJ/cm$^2$ and 210 mJ/cm$^2$ at 361 nm is sufficient to fully bleach a 0.42 micron film. All of the nitrones are sensitive to light in the 200 to 350 nm region. Some are sensitive to wavelengths as long as 400 nm. These must be protected from room lights.

Typical refractive indices (measured at 815 nm) of these polymeric nitrones are 1.5–1.7. Specifically, for poly(vinylbenzyl(4-(N-phenyl-α-nitronyl)phenyl)ether), the refractive index of a film on quartz measured at 815 nm is 1.5729. The change in refractive index of these polymers is typically 0.02–0.04. For poly(vinylbenzyl(4-(N-phenyl-α-nitronyl)phenyl)ether) the change in refractive index at 815 nm with a 210 mJ/cm$^2$ total fluence at 361 nm is 0.0364. In general, the refractive index before irradiation will be lower for the N-alkyl nitrones compared to the corresponding N-aryl nitrones. Compared to the methacrylate chain based nitrones of the aforementioned commonly assigned copending U.S. appl. Ser. No. 664,248, now U.S. Pat. No. 5,176,983 these materials will generally have higher refractive indices because of the aromatic nature of the polymer backbone. This can be advantageous when placing the materials on thermally and photochemically cured buffers such as cured and cross linked acrylates and methacrylates. The waveguiding criterion (refractive index of the guide higher than the refractive index of the substrate) is more easily maintained and a wider choice of buffer systems is possible with these higher index materials.

With reference to formula I, above, operable ranges of n in all cases are from above about 10, and preferably up to about 2000, with more prefered ranges of from about 20 to about 400, with the most preferred range being from about 70 to about 400. The number average molecular weight most preferred for spin casting is in the order of from about 10,000 to 150,000. At molecular weights higher than about 150,000, there is a tendency for the viscosities of the solutions to become too high, even at relatively low weight percent solids content, for proper application by spin casting.

The more preferred embodiments will have p=1 (formula V, above) with R$^2$=H and Z being either aromatic or aliphatic (formulas VI and VII, above). The yet more preferred embodiments would encompass polymers of formula VII, above, in which Z is C$_1$–C$_{20}$ alkyl, straight chain, branched or cyclic or (CH$_2$)$_s$—PhR$^3$R$^4$ wherein s=0. Most preferred would be those polymers of formula VII, above, with Z=C$_1$–C$_4$ alkyl, desirably branched to prevent tautomerization. These materials should be more stable toward hydrolysis and show lower waveguide transmission losses upon photodelineation. The oxaziridines and thermal and photochemical products derived therefrom are more stable and do not form long wavelength (near infrared laser diode wavelengths, e.g. 670–1000 nm) absorbing species on irradiation with ultraviolet light. The most preferred embodiment is that wherein Z is tert-butyl. When Z includes an aromatic moiety, then the phenyl or benzyl groups are preferred.

The polymeric nitrones of the present invention can be used to create thin films with refractive index patterns for optical waveguides on a wide variety of substrates including glass, plastics, polyimide circuit board laminates, metal conductors, silicon and oxidized silicon wafers, gallium arsenide wafers and other substrates used for electronic and optoelectronic devices and circuitry. Of course, some substrates would require an interposed buffer layer, as is conventional and known to those skilled in the art. These polymers can be cast as thin films on these substrates from solution, in conventional manner. Typically, the polymer is dissolved in a suitable solvent, such as dimethylformamide, dimethylacetamide or dimethylsulfoxide to form a solution containing from about 10 to about 35 percent by weight, preferably from about 15 to about 30 percent by weight of the polymer.

These solutions can be applied by dip coating, doctor blading or spin casting to obtain films whose thickness will generally be from about 0.1 to about 100 μm. For films of thickness greater than approximately 10 μm, dip coating or doctor blading will be generally preferred. The spin casting method is capable of producing films with low surface roughness and uniform thickness in the order of about 0.1 to 10 μm. After the polymer is coated on the desired substrate, the film is baked at temperatures and for time sufficient to remove the solvent, preferably at a temperature within ±10 degrees of the glass transition temperature of the polymer. When spin casting from dimethylformamide, dimethylacetamide or dimethylsulfoxide solutions at ambient humidity above about 35 percent, the spin casting operation is desirably carried out under dry nitrogen to prevent condensation and premature precipitation of the polymer from the solution.

Optical waveguides employing the polymeric nitrones of the present invention can be prepared by imposing refractive index patterns on the substrate-supported films, by means such as photochemical delineation. The coated transparent films can be patterned by selectively exposing areas of the film to effective radiation using a lithographic contact or projection mask having negative patterns. The term "negative pattern" as employed herein refers to a pattern in which the regions where a decrease in the refractive index is sought transmit the radiation to induce photochemical rearrangement of the nitrone. Generally, these regions would define the boundaries of waveguiding regions. Both the irradiated and unirradiated films are transparent to radiation having wavelength longer than that of the effective radiation causing the photochemical bleaching. The term "transparent" as employed herein refers to an optical medium which transmits useful intensities of the light being guided in the film. An alternative way to photochemically induce refractive index patterns in these materials for waveguides and integrated optics would be to scan a UV or visible laser source, which has been focussed tightly using appropriate lens systems, in the desired pattern. In general means for forming waveguides in polymeric films using photochemically induced refractive index patterns are known to those skilled in the art.

The present invention will be better understood with reference to the following examples, which also set forth the best mode presently contemplated for its practice.

EXAMPLE 1

Synthesis of Poly(vinylbenzyl(4-formylphenyl)ether

To a solution of 20 g of poly(vinylbenzyl chloride) [Aldrich, 60/40 mixture of 3- and 4- position isomers] in 100 mL of anhydrous DMF under nitrogen was added 23.9 g of 4-hydroxybenzaldehyde and approximately 54 g of potassium carbonate that had been ground with a mortar and pestle. The slurry was heated to 80° C. and stirred for 3 days. The reaction mixture was cooled to room temperature and was poured into 300 mL of water. The white-tan polymer that precipitated was filtered using a medium frit sintered glass funnel. The polymer was slurried in 300 mL of water, stirred for thirty minutes and then refiltered. The polymer was then dissolved in ca. 100 mL of methylene chloride poured into water and the solvents were decanted. The polymer was air dried for 24h and then dried in vacuo at 26° C. for 24 h to give 31.6 g. $^1$H NMR (CDCl$_3$) 9.9–9.6 (aldehyde), 8.1–7.5, 7.5–6.0, 5.2–4.6, 2.4–1.0; $^{13}$C NMR (CDCl$_3$) 191 (aldehyde), 163, 145, 136, 131, 130, 129–122, 114, 70, 46–39; IR (KBr) 1693 cm$^{-1}$. The polymer has a glass transition temperature of 67° C. and by TGA showed less than 1% weight loss up to 250° C. The intrinsic viscosity in DMF at 35° C. was 0.38.

EXAMPLE 2

Reaction of Phenylhydroxylamine with Poly(vinylbenzyl(4-formylphenyl)ether): Synthesis of Poly(vinylbenzyl(4-(N-phenyl-α-nitronyl)phenyl)ether)

To a solution of 3.0 g of poly(vinylbenzyl(4-formylphenyl)ether), prepared as in Example 1, in methylene chloride was added 1.78 g of phenylhydroxylamine. The resulting solution was stirred in the dark at room temperature for 7 days and then the methylene chloride was removed In vacuo. The polymer was redissolved in the minimal amount of methylene chloride and precipitated in ca. 2.5 times that volume of methanol. The polymer was collected by vacuum filtration, redissolved in methylene chloride and reprecipitated in methanol. The reprecipitated polymer was dried at 25° C. in a vacuum oven. $^1$H NMR (CDCl$_3$) 8.4–8.2, 7.8–7.5, 7.4–7.2, 7.2–6.7, 6.7–6.2, 5.0–4.5, 2.2–1.0; $^{13}$C NMR (CDCl$_3$) 161, 149, 146–144, 136, 134, 131, 129, 128–124, 124, 121, 115, 70, 46–39. The polymer showed a weak transition at ca. 60° C. in the DSC possibly due to a glass transition temperature with exotherms at 182° and 211° C. TMA indicated a possible glass transition temperature at 113° C. Thermal gravimetric analysis showed two weight loss steps below 300° C. with a total of 6% loss by 200° C. The intrinsic viscosity in DMF at 35° C. was 0.36.

EXAMPLE 3

Reaction of Poly(formylstyrene) with Phenylhydroxylamine: synthesis of Poly(3-/4-(N-phenyl-α-nitronyl)styrene Poly(formylstyrene) [approximately 60/40 m/p ratio, 4.7 g] and phenylhydroxylamine (3.5 g) were dissolved in 130 mL of dry THF and stirred at room temperature for 48 h. An aliquot of this solution was removed and treated with water until a precipitate formed. The polymer was filtered, washed with water and dried in vacuo. The polymer was soluble in chloroform, dimethylsulfoxide and tetrahydrofuran. The $^1$H NMR spectrum of the polymer showed no aldehyde $^1$H resonance. A UV spectrum of the polymer prepared by spin coating a quartz disc (0.74 g of the polymer in 2 mL of diglyme, 2000 rpm, baked at 166° C.) showed an absorption maximum at ca. 323 nm as well as the 250 nm absorbance associated with the absorption of the phenyl groups of polystyrene. Irradiation of this film through pyrex glass with a 1000 W xenon arc lamp resulted in the bleaching of the 323 nm absorption peak.

EXAMPLE 4

Photochemically Induced Refractive Index Changes in Thin Films of Poly(vinylbenzyl(4-(N-phenyl-α-nitronyl)phenyl)ether)

A solution of 180 mg of poly(vinylbenzyl(4-(N-phenyl-α-nitronyl)phenyl)ether) in 1 mL of dimethylacetamide was filtered through a 0.45 micron TFE filter and was spin coated on a 1" diameter quartz disc (4000 rpm). The film was baked at 80° C. for 30 min. The film thickness was measured to be 0.42 microns. The film was irradiated with a 1000W xenon arc lamp through a 361 nm interference filter (11 nm FWHM, 0.7 mW cm$^{-2}$) and the effective refractive index of the single guided mode carried by the film was monitored as a function of photochemical dose. Table 1, below, summarizes the data.

TABLE 1

Effective refractive index of the TE$_0$ mode for a slab waveguide of poly(vinylbenzyl(4-(N-phenyl-α-nitronyl)phenyl)ether) on quartz as a function of irradiation dose at 361 nm.

| Fluence (mJ/cm$^2$) | n$_{effective}$ |
| --- | --- |
| 0 | 1.5729 |
| 10.5 | 1.5685 |
| 21 | 1.5666 |
| 42 | 1.5609 |
| 63 | 1.5545 |
| 84 | 1.5472 |
| 126 | 1.5396 |
| 168 | 1.5377 |
| 210 | 1.5365 |

EXAMPLE 5

Ultraviolet Photochemical Bleaching of a Thin Film of Poly(vinylbenzyl(4-(N-phenyl-α-nitronyl)phenyl)ether A solution of 180 mg of poly(vinylbenzyl(4-(N-phenyl-α-nitronyl)phenyl)ether) in 1 mL of anhydrous dimethylacetamide was filtered through a 0.45 micron filter and spin coated on a quartz disc at 4000 rpm. The thin film was then baked at 80° C. for 30 min. The film exhibited two primary absorption maxima at $\lambda_{max}=330$ nm and $\lambda_{max}=245$ nm and an absorption cutoff at approximately 215 nm. The film was then irradiated with a 1000 W xenon arc lamp through a 361 nm narrow band interference filter (11 nm FWHM, 0.7 mW/cm$^2$). Absorption spectra were taken at nine dose intervals. Table 2 provides a list of the optical density measured at 330 nm as a function of total fluence.

TABLE 2

Change in optical density measured at 330 nm for a 0.42 micron film of poly(vinylbenzyl(4-(N-phenyl-α-nitronyl)phenyl)ether) on quartz as a function of total fluence.

| Fluence (mJ/cm$^{-2}$) | OD (at 330 nm) |
|---|---|
| 0 | 2.96 |
| 10.5 | 2.34 |
| 21 | 2.12 |
| 42 | 1.70 |
| 63 | 1.52 |
| 84 | 1.06 |
| 126 | 0.64 |
| 168 | 0.40 |
| 210 | 0.36 |

After a total fluence of 210 mJ/cm$^2$, the film thickness was measured to be 0.42 microns using a DekTak profilometer.

EXAMPLE 6

Thermal Stability of a Thin Film of Poly(vinylbenzyl(4-(N-phenyl)-α-nitronyl)phenyl)ether)

A solution of 180 mg of poly(vinylbenzyl(4-(N-phenyl-α-nitronyl)phenyl)ether) in 1 mL of anhydrous dimethylacetamide was filtered through a 0.45 micron filter and spin coated on a quartz disc at 4000 rpm. The film was baked for 30 min. at 80° C. Absorption spectra were taken at timed intervals during heating of the sample in a vacuum oven at 130° C. The primary absorption band of the nitrone ($\lambda_{max}=330$ nm) was monitored as an indication of the thermal stability of the polymer. Table 3 lists the optical density measured at 330 nm as a function of time at 130° C.

TABLE 3

The optical density (measured at 330 nm) of a thin film of poly(vinylbenzyl(4-(N-phenyl-α-nitronyl)penyl)ether) on quartz as a function of baking time at 130° C.

| Time (h) | OD (at 330 nm) |
|---|---|
| 0 | 2.86 |
| 2 | 2.68 |
| 8.5 | 2.62 |
| 34.5 | 2.52 |

EXAMPLE 7

Reaction of tert-Butylhydroxylamine with Poly(vinylbenzyl(4-formylphenyl)ether): Synthesis of Poly(vinylbenzyl(4-(N-tert-butyl-α-nitronyl)phenyl)ether)

To a solution of 2 g of poly(vinylbenzyl(4-formylphenyl)ether) [prepared as in Example 1] in methylene chloride is added 1.5 g of tert-butylhydroxylamine. This solution is stirred in the dark at room temperature for 7 days and then poured into methanol or hexanes. The precipitated polymer is collected by vacuum filtration and then redissolved in methylene chloride and reprecipitated into hexanes or methanol. The polymer is collected and dried at room temperature in vacuo.

EXAMPLE 8

Photochemical Bleaching of a Thin Film of Poly(vinylbenzyl(4-(N-phenyl-α-nitronyl)phenyl)ether)

0.3 grams of the homopolymer of Example 2 was dissolved in 1.37 grams of dimethylacetamide to provide a solution which was 18 percent solids by weight. The solution was filtered through a 0.45 μm filter, and the filtrate was pipetted onto a clean quartz substrate and spin coated for 30 seconds at 5,500 rpm. The substrate was then baked for 20 min. at 80° C. to provide a dry polymer film 0.82 μm thick. The UV absorption spectrum of the film was recorded with a Perkin-Elmer UV/VIS spectrophotometer. The spectrum consisted of a single absorption peak at approximately 330 nm with an optical density much greater than 4.0. The polymer film was irradiated with a 1000 W xenon lamp through a 375 nm narrow band interference filter. The total irradiation dose was 300 mJ/cm$^2$. Following irradiation, the UV absorption spectrum was again recorded. The absorption peak at 335 nm was almost completely bleached (removed) and a small photoproduct peak was observed at 275 nm in the deep UV.

EXAMPLE 9

Formation of a Channel Waveguide in a Thin Film of Poly(vinylbenzyl(4-(N-phenyl-α-nitronyl)phenyl)ether)

The polymer solution of Example 8 was used to spin coat a polymer film onto a silicon wafer substrate bearing a 1.6 μm thick silicon dioxide layer. The spin speed was 5,500 rpm and the film was baked for 20 minutes at 80° C. to provide a 0.82 μm thick polymer film. This polymer film was contact exposed to radiation through a mask bearing channel waveguide patterns. The exposing radiation was filtered through a 357 nm interference filter; the dose was 350 mJ/cm$^2$. After exposure, the wafer substrate was cleaved twice perpendicular to the waveguide pattern to yield a 3.5 cm long section. The cleaved end of the polymer film was butt-coupled to a fiber optic carrying 810 nm laser light. The fiber optic was positioned at the end of a channel waveguide whose mask dimension was 3.5 μm in linewidth. Laser light was coupled into the channel waveguide pattern and a CCD camera positioned above the film recorded the pattern of light as it proceeded across the film. A thin straight line of light was observed to cross the wafer surface without any lateral spreading, indicating successful containment of the light within the channel waveguide pattern. To further confirm this result, the output light from the second cleavage surface was imaged onto the faceplate of the CCD camera to record its near field image. The image observed was a single round output mode indicating single-mode channel waveguide operation.

When other polymer compounds are prepared in general conformance to the procedures described above and in the examples, and are fabricated into waveguide structures, similar advantageous results are obtained. With respect to the polymer compositions, other substituents for the compositions of the above formulas I through VII include, but are not limited to, the following:

$R^1$: methyl, ethyl, propyl, butyl, pentyl, hexyl, heptyl, octyl, nonyl, decyl, dodecyl, and the like;

$R^2$: methyl, ethyl, propyl, iso-propyl, butyl, pentyl, hexyl, phenyl (incl. lower alkyl-substituted phenyl), benzyl, and the like;

Z: methyl, ethyl, propyl, iso-propyl, butyl, tert-butyl, pentyl, hexyl, cyclo-hexyl, heptyl, octyl, nonyl, decyl, dodecyl and the like; as well as phenyl and benzyl, both substituted in the m- and/or p- position with substituents selected from the group consisting of halogen (F, Cl, Br, I), —CN, —NO$_2$, —R$^5$, —OR$^5$, —COOR$^5$ and —C≡CHCOOR$^5$ (wherein R$^5$ may include, but is not limited to, methyl, ethyl, propyl, iso-propyl, butyl, tert-butyl, pentyl, hexyl, cyclo-hexyl, heptyl, octyl, nonyl, decyl, dodecyl, and the like).

Exemplary suitable starting polymeric aldehydes for making polymeric nitrones of the present invention having a styrene-derived backbone chain include:
poly(4-formylstyrene),
poly(3-formylstyrene),
poly(3-/4-formylstyrene),
poly(3-vinylbenzyl(4-formylphenyl)ether),
poly(4-vinylbenzyl(4-formylphenyl)ether),
poly(3-/4-vinylbenzyl(4-(formylphenyl)ether,
poly(4-phenacylstyrene),
and the like. To obtain polymeric nitrones of this invention, these starting polymeric aldehydes can be reacted, as above described, with any one of these exemplary hydroxylamines, infra, of the formula (CH$_3$)$_3$C—N-HOH, (Ph)$_2$CH—NHOH, or

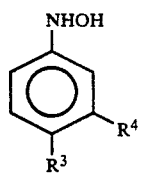

wherein R$^3$ and R$^4$ have the afore-stated meaning.

Since various changes may be made in the invention without departing from its spirit and essential characteristics, it is intended that all matter contained in the description shall be interpreted as illustrative only and not in a limiting sense, the scope of the invention being defined by the appended claims.

I claim:

1. A polymeric nitrone of the composition:

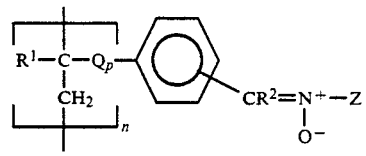

wherein:
n is greater than about 10;
p is 0 or 1;
R$^1$ is H or C$_1$-C$_{20}$ alkyl, straight chain, branched or cyclic, with the proviso that when R$^1$ is an alkyl group other than methyl, then its α-carbon always represents a —CH$_2$— group;
R$^2$ is H, C$_1$-C$_6$ alkyl, phenyl or benzyl;
Q is a

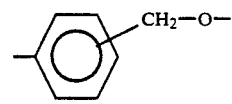

bridging group, wherein the —CH$_2$—O— substituent is in the m- or p- position;
Z is
(i) C$_1$-C$_{20}$ alkyl, straight chain, branched or cyclic; or
ii)

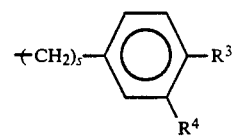

wherein s is 0 or 1, and wherein R$^3$ and R$^4$, which may be the same or different, are selected from the group consisting of H, F, Cl, Br, I, —CN, —NO$_2$, —R$^5$, NR$^5_2$, —OR$^5$, —COOR$^5$ and —CH≡CHCOOR$^5$ wherein R$^5$, which may be the same or different in different R$^5$ groups, is a C$_1$-C$_{20}$ alkyl group, straight chain, branched or cyclic.

2. A polymeric nitrone according to claim 1 wherein R$^1$ is selected from the group consisting of H and C$_1$-C$_{10}$ alkyl, straight chain, branched or cyclic.

3. A polymeric nitrone according to claim 1 wherein R$^1$ is selected from the group consisting of H and C$_1$-C$_4$ alkyl, and R$^2$ is selected from the group consisting of C$_1$-C$_6$ alkyl.

4. A polymeric nitrone according to claim 1 wherein R$^1$ is selected from the group consisting of H and C$_1$-C$_4$ alkyl, and R$^2$ is phenyl or benzyl.

5. A polymeric nitrone according to claim 1 wherein R$^1$ and R$^2$ are both H.

6. A polymeric nitrone according to claim 1 having the composition

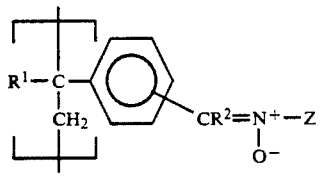

wherein n, $R^1$, $R^2$ and Z have the meaning given in claim 1.

7. A polymeric nitrone according to claim 6 wherein $R^1$ is selected from the group consisting of H and $C_1$-$C_{10}$ alkyl, straight chain, branched or cyclic.

8. A polymeric nitrone according to claim 6 wherein $R^1$ is H and $R^2$ is selected from the group consisting of H and $C_1$-$C_6$ alkyl.

9. A polymeric nitrone according to claim 6 wherein $R^1$ is H and $R^2$ is selected from the group consisting of phenyl and benzyl.

10. A polymeric nitrone according to claim 6 wherein $R^1$ and $R^2$ are both H.

11. A polymeric nitrone according to claim 1 having the composition

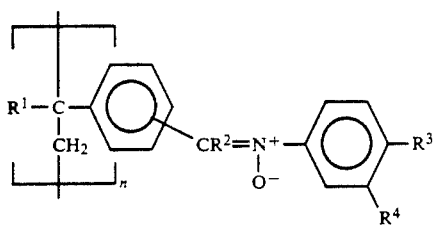

wherein n, $R^1$, $R^2$, $R^3$ and $R^4$ have the meaning given in claim 1.

12. A polymeric nitrone according to claim 11 wherein $R^1$ is selected from the group consisting of H and $C_1$-$C_{10}$ alkyl, straight chain, branched or cyclic, and $R^2$ is selected from the group consisting of H and $C_1$-$C_6$ alkyl, straight chain, branched or cyclic.

13. A polymeric nitrone according to claim 11 wherein $R^1$ is selected from the group consisting of H and $C_1$-$C_{10}$ alkyl, straight chain, branched or cyclic, is phenyl or benzyl.

14. A polymeric nitrone according to claim 11 wherein $R^1$ and $R^2$ are both H.

15. A polymeric nitrone according to claim 11 wherein $R^3$ and $R^4$ are independently selected from the group consisting of H, halogen, $C_1$-$C_4$ alkyl, —CN and —$NO_2$.

16. A polymeric nitrone according to claim 15 wherein $R^3$ and $R^4$ are both H.

17. A polymeric nitrone according to claim 1 having the composition

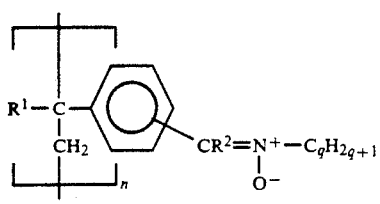

wherein n, $R^1$, $R^2$ and q have the meaning given in claim 1.

18. A polymeric nitrone according to claim 17 wherein $R^1$ is selected from the group consisting of H and $C_1$-$C_{10}$ alkyl, straight chain, branched or cyclic, and $R^2$ is selected from the group consisting of H and $C_1$-$C_6$ alkyl, straight chain, branched or cyclic.

19. A polymeric nitrone according to claim 17 wherein $R^1$ is selected from the group consisting of H and $C_1$-$C_{10}$ alkyl, straight chain, branched or cyclic, is phenyl or benzyl.

20. A polymeric nitrone according to claim 17 wherein $R^1$ and $R^2$ are both H.

21. A polymeric nitrone according to claim 17 wherein —$C_qH_{2q+1}$ is branched.

22. A polymeric nitrone according to claim 20 wherein —$C_qH_{2q+1}$ is selected from the group consisting of isopropyl and tert-butyl.

23. A polymeric nitrone according to claim 1 having the composition

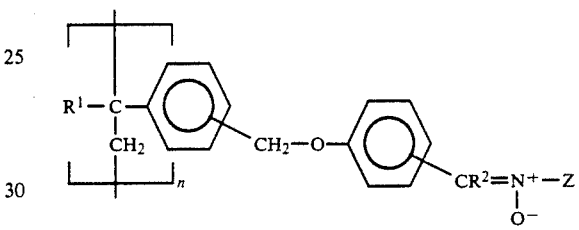

wherein n, $R^1$, $R^2$ and Z have the meaning given in claim 1.

24. A polymeric nitrone according to claim 23 wherein $R^1$ is selected from the group consisting of H and $C_1$-$C_{10}$ alkyl, straight chain, branched or cyclic, and $R^2$ is selected from the group consisting of H and $C_1$-$C_6$ alkyl, straight chain, branched or cyclic.

25. A polymeric nitrone according claim 23 wherein $R^1$ is selected from the group consisting of H and $C_1$-$C_{10}$ alkyl, straight chain, branched or cyclic, and $R^2$ is phenyl or benzyl.

26. A polymeric nitrone according to claim 23 wherein $R^1$ and $R^2$ are both H.

27. A polymeric nitrone according to claim 1 having the composition

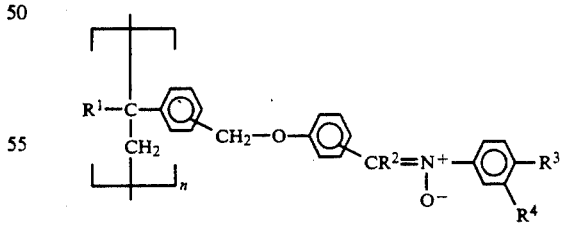

wherein n, $R^1$, $R^2$, $R^3$ and $R^4$ have the meaning given in claim 1.

28. A polymeric nitrone according to claim 27 wherein $R^1$ is selected from the group consisting of H and $C_1$-$C_{10}$ alkyl, straight chain, branched or cyclic, and $R^2$ is selected from the group consisting of H and $C_1$-$C_6$ alkyl, straight chain, branched or cyclic.

29. A polymeric nitrone according to claim 27 wherein $R^1$ is selected from the group consisting of H and $C_1$–$C_{10}$ alkyl, straight chain, branched or cyclic, and $R^2$ is phenyl or benzyl.

30. A polymeric nitrone according to claims 27 wherein $R^1$ and $R^2$ are both H.

31. A polymeric nitrone according to claim 27 wherein $R^3$ and $R^4$ are independently selected from the group consisting of H, halogen, $C_1$–$C_4$ alkyl, —CN and —$NO_2$.

32. A polymeric nitrone according to claim 31 wherein $R^3$ and $R^4$ are both H.

33. A polymeric nitrone according to claim 1 having the composition

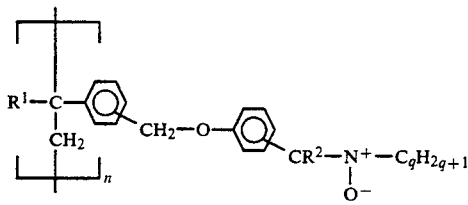

wherein $R^1$, $R^2$, n and q have the meaning given in claim 1.

34. A polymeric nitrone according to claim 33 wherein $R^1$ is selected from the group consisting of H and $C_1$–$C_{10}$ alkyl, straight chain, branched or cyclic, and $R^2$ is selected from the group consisting of H and $C_1$–$C_6$ alkyl, straight chain, branched or cyclic.

35. A polymeric nitrone according to claim 33 wherein $R^1$ is selected from the group consisting of H and $C_1$–$C_{10}$ alkyl, straight chain, branched or cyclic, and $R^2$ is phenyl or benzyl.

36. A polymeric nitrone according to claim 33 wherein $R^1$ and $R^2$ are both H.

37. A polymeric nitrone according to claim 33 wherein —$C_qH_{2q+1}$ is branched.

38. A polymeric nitrone according to claim 37 wherein —$C_qH_{2q+1}$ is selected from the group consisting of isopropyl and tert-butyl.

39. A polymeric nitrone according to claim 1 which is poly(vinylbenzyl(4-(N-phenyl-α-nitronyl)phenyl)ether).

40. A polymeric nitrone according to claim 1 which is poly(vinylbenzyl(4-(N-tert-butyl-α-nitronyl)phenyl)ether).

41. A substrate having deposited thereon a film comprising a polymeric nitrone according to any one of claims 1, 6, 10, 11, 14, 16, 17, 20, 21, 23, 26, 27, 30, 32, 33, 36, 37, 39 or 40.

* * * * *